United States Patent [19]

Sakamoto

[11] Patent Number: 4,821,099
[45] Date of Patent: Apr. 11, 1989

[54] IMAGE READING MEANS WITH CONTROLLABLE SHADING CORRECTION

[75] Inventor: Masahiro Sakamoto, Tokyo, Japan

[73] Assignee: Canon Kabushiki Kaisha, Tokyo, Japan

[21] Appl. No.: 895,702

[22] Filed: Aug. 12, 1986

[30] Foreign Application Priority Data

Aug. 14, 1985 [JP] Japan .................................. 60-177646
Aug. 14, 1985 [JP] Japan .................................. 60-177647
Aug. 14, 1985 [JP] Japan .................................. 60-177648

[51] Int. Cl.4 ......................... H04N 5/14; H04N 5/228
[52] U.S. Cl. .................................................... 358/163
[58] Field of Search ............................. 382/53, 54, 50; 358/282, 163

[56] References Cited

U.S. PATENT DOCUMENTS

| | | | |
|---|---|---|---|
| 3,568,151 | 3/1971 | Majima | 382/53 |
| 4,408,231 | 10/1983 | Bushaw et al. | 358/280 |
| 4,556,916 | 12/1985 | Matsunawa | 382/50 |
| 4,675,533 | 6/1987 | Shimizu | . |
| 4,691,365 | 9/1987 | Nagashima | . |

Primary Examiner—Theodore M. Blum
Attorney, Agent, or Firm—Fitzpatrick, Cella, Harper & Scinto

[57] ABSTRACT

There is disclosed an image reader capable of releasing constant output regardless of fluctuation in circumferential factors. Output of the image sensor is amplified by an amplifier, of which the factor of amplification is regulated to provide a predetermined level when the image sensor reads a reference image.

25 Claims, 5 Drawing Sheets

IMAGE READING MEANS WITH CONTROLLABLE SHADING CORRECTION

BACKGROUND OF THE INVENTION

1. Field of the Invention

The present invention relates to an image reading apparatus, and in particular to an image reading apparatus capable of compensating unevenness in the output in image reading.

2. Related Background Art

There are already known various apparatus capable of image reading, such as facsimiles or copying machines, and the image reading in such apparatus is mostly conducted by reflected light obtained by illuminating an original document with a light source. Such apparatus are usually provided with a device for correcting shading distortion in the obtained image signals or maintaining the obtained image signals at a constant gain, thereby attaining a constant reading condition, since light sources, such as flourescent lamp are usually unable to provide a constant intensity over the entire length thereof and show a change in light intensity over time, and also the image reading element is associated with fluctuation and deterioration over time.

Figure 1:
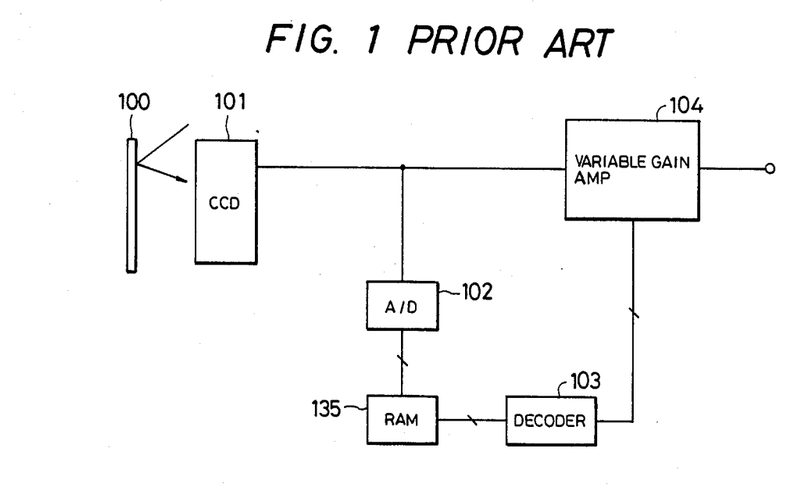
FIG. 1 is a block diagram of an example of a conventional correcting apparatus for shading distortion.

FIG. 1 shows an image reading apparatus with conventional correction for shading distortion.

In FIG. 1, the reflected light from an original is focused, through an optical system such as a lens or a prism, onto a CCD sensor 101, functioning as a photoelectric converting element.

A white reference plate 100 is provided in a predetermined position in the image reading system, and the light reflected from said white reference plate is introduced into the CCD sensor 101 in order to obtain data on the shading distortion.

The output signal from the CCD sensor 101 is released through a variable gain amplifier 104. Also the CCD sensor 101 is connected to an A/D converter 102 to store the output of the CCD sensor 101 in a random access memory (RAM) 135 in the form of digital data of plural bits representing output level. The output of said RAM 135 is converted in a decoder 103 to control the gain of said variable gain amplifier 104 and is supplied to a control input terminal thereof.

In the above-explained structure, the white reference plate 100 is scanned by the CCD sensor 101 prior to the image reading, and the output thereof is converted into digital data by the A/D converter 102 and stored in the RAM 135. For example, a deficiency in the light intensity may occur in an end area of the reference plate 100 due to uneven distribution of the light intensity of the light source, and corresponding data are stored in the RAM 135.

Subsequently, an original to be read is scanned by the CCD sensor 101, and, at the same time data are read from the RAM 135 in synchronization with the output of image signals from the CCD sensor 101. The data read from the RAM 135 are supplied, through the decoder 103, to the amplifier 104 to regulate the gain thereof. In this manner it is rendered possible to correct the shading distortion for example in end portions, and to obtain uniform image data over the entire area of the original.

In such conventional structure, however, it has been difficult to reduce the cost since a random access memory of a large capacity is required for storing image data converted into digital data by the A/D converter. Particularly in cases where high-speed processing is required, there will be required an A/D converter capable of functioning at a high speed, thus complicating the structure and elevating the cost.

SUMMARY OF THE INVENTION

In consideration of the foregoing an object of the present invention is to provide an image reading apparatus capable of satisfactorily correcting unevenness in the image output signals caused for example by a shading phenomenon, without the use of a memory of a large capacity or an expensive high-speed device.

Another object of the present invention is to provide an image reading apparatus capable of satisfactorily reading an original image and providing optimum image output signals.

Still another object of the present invention is to provide an image reading apparatus adapted for use in image reading in facsimile, copying machine or the like.

According to on aspect of the present invention, these objects are achieved by means of an image reading apparatus in which output of a reading device, which photoelectrically reads an image line by line, is amplified, and the amplifying means is controlled during reading of an original based on control data stored for that purpose. The control data so stored are determined on the basis of the condition that the level of the output signals of the amplifying means should be substantially constant during reading of a reference member by the reading means.

According to a second aspect of the invention, the foregoing objects are achieved by providing an apparatus including a peak detector, for detecting a peak level of the output of the amplifying means during reading of a reference member. According to this aspect of the invention, the control condition of the amplifying means is that, during reading of the reference member, the output of the amplifying means is substantially equal to the detected peak level.

According to still another aspect of the invention, the foregoing objects are achieved by means of an apparatus which photoelectrically reads an image line by line and amplifies the resulting output signals, and in which a means is provided for detecting a status of change in the output signals of the reading means upon reading of a reference member. The amplifying means is controlled, during reading of an original image, based upon data read out for that purpose from a storing means. The stored data indicate the status of change of reading means output signals detected by the detecting means.

The foregoing and still other objects of the present invention, and the advantages thereof, will become fully apparent from the following description.

DESCRIPTION OF THE PREFERRED EMBODIMENTS

Now the present invention will be clarified in detail by reference to an embodiment thereof shown in the attached drawings.

Figure 2:
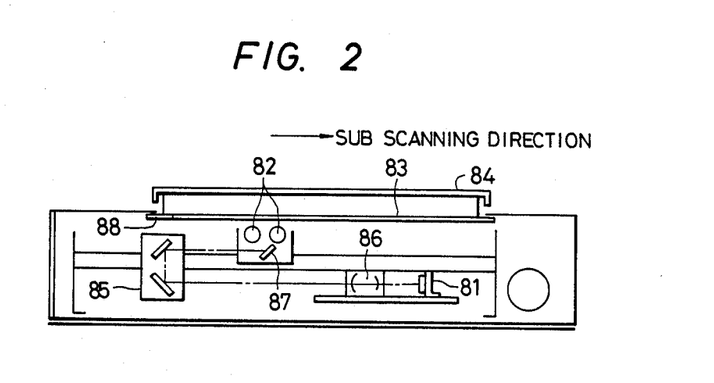
FIG. 2 is a schematic view of an image reading apparatus embodying the present invention.

FIG. 2 schematically shows an image reading apparatus embodying the present invention, which is adapted for use in a facsimile, a copying machine, an electronic file or the like. In FIG. 2, an original document to be read is placed, with the image-bearing face thereof downward, on an original support glass 83 and positioned with reference to a far-end side and a left-end side of the apparatus in the illustration. The original is maintained on said glass by an original cover 84. It is illuminated by a fluorescent lamp 82, and an optical path is so formed as to guide the reflected light through mirrors 85, 87 and a lens 86 onto a CCD sensor 81 composed of a linear array of plural photosensor elements. Said mirrors 87 and 85 are rendered movable with a speed ratio of 2:1, and these optical units move from left to right at a constant speed under a phase-locked loop control.

A reference member 88, composed for example of a uniform white plate, is provided to obtain output characteristics of the CCD sensor 81 for example including shading phenomenon.

The original image is read line by line with the CCD sensor 81.

Figure 3A:
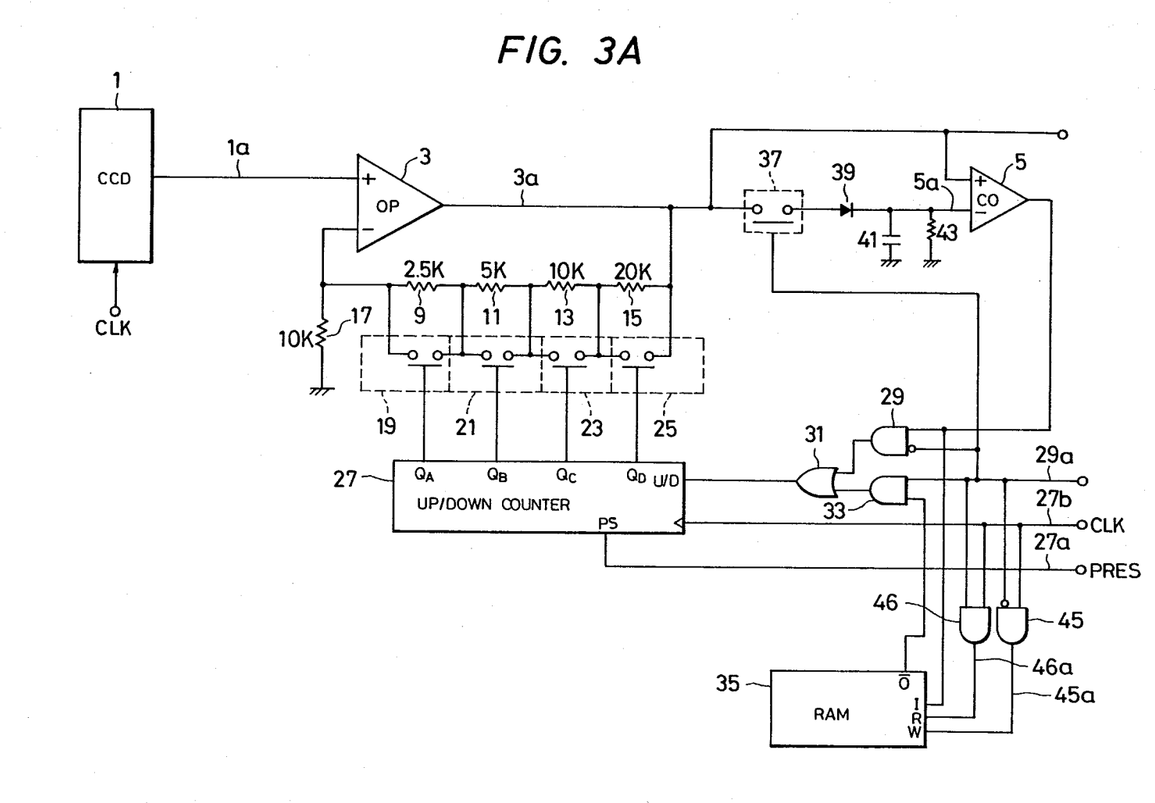
FIGS. 3A and 3B are circuit diagrams of an image reading apparatus embodying the present invention.
Figure 3B:
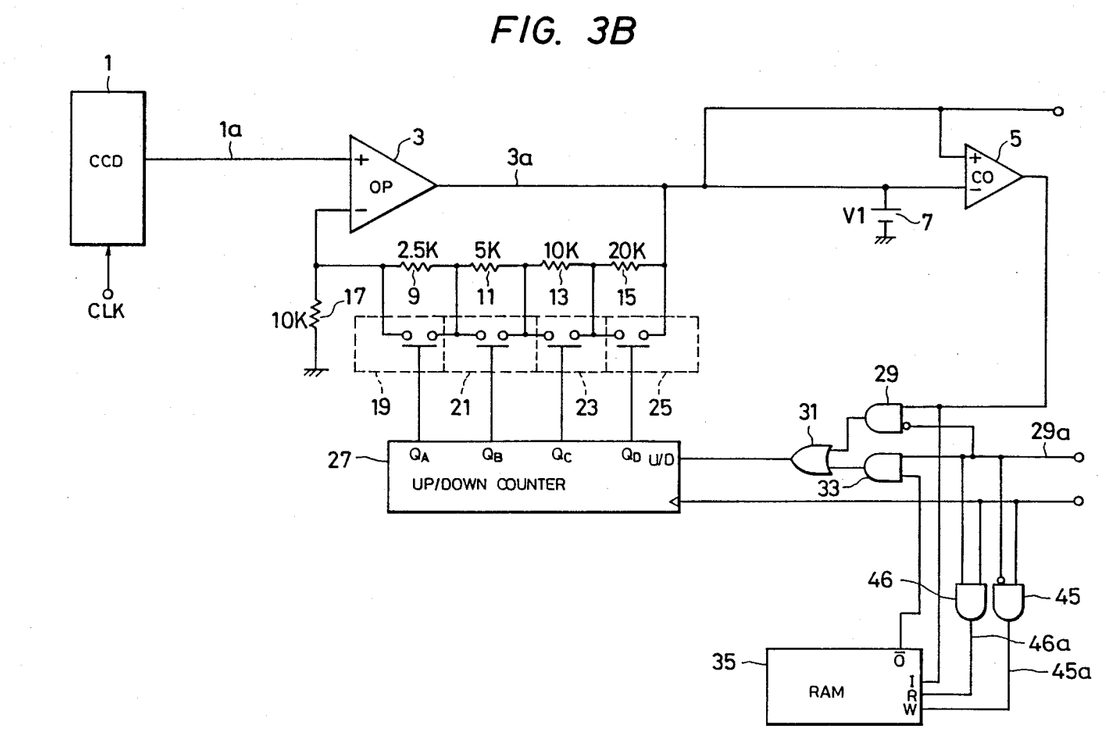

FIGS. 3(A) and 3(B) are circuit diagrams of embodiments for processing the output of the CCD sensor, wherein FIG. 3(A) shows an example of shading correction while FIG. 3(B) shows an example of gain control. In these drawings a CCD sensor 1 has a similar structure to that of the CCD sensor 81 shown in FIG. 2, and has a length to be explained later.

The output signals of the CCD sensor 1 are supplied, through a signal line 1a and according to clock signals CLK, to an operational amplifier 3, of which output is released through a signal line 3a. The inverted input terminal of the amplifier 3 is grounded through a resistor 17, and also receives a feedback of the output of said amplifier 3 through four feedback resistors 9, 11, 13, 15. As already known, the gain of an operational amplifier circuit is determined by the ratio of the feedback resistor and an input resistor connected thereto. In this embodiment the resistors 9, 11, 13, 15 have mutually different resistances and can be suitably shortcircuited by switches 19, 21, 23, 25 to regulate the amplification factor of the amplifier 3. Said switches 19, 21, 23, 25 are controlled by a 4-bit output of an up-down counter 27, which receives, through a signal line 27b, clock signals CLK used also for driving the CCD sensor 1. Also a signal line 27a is provided to preset a desired value in the counter 27 by means of a signal PRES.

The counting operation of the up-down counter 27 is controlled by a gate circuit, composed of AND gates 29, 33 and an OR gate 31. Input terminals of the AND gates 29, 33 are respectively connected to an output terminal of a comparator 5 and an output terminal 0 of the RAM 35, of which read/write control is achieved by a signal on an input signal line 29a connected to the other input terminals of said AND gates 29, 33 and the afore-mentioned clock signals CLK, said signals being supplied to the RAM 35 through AND gates 45, 46 and signal lines 45a, 46a.

The signal of the signal line 29a also controls a switch 37 connected to a signal line 3a, and said switch 37 is connected, through a diode 39, to the inverted input terminal of the comparator 5. In the circuit shown in FIG. 5(A), the input signal line 5a of the comparator 5 is grounded through a peak retention circuit composed of a capacitor 41 and a resistor 43. Also, the non-inverted input terminal of said comparator 5 is directly connected to the signal line 3a. In the circuit shown in FIG. 3(B), the peak retention circuit composed of the capacitor 41 and resistor 43 is replaced by a constant-voltage power supply 7, of which output voltage V1 is supplied to the inverted input terminal of the comparator 5. Other structures are same as those in FIG. 3(A).

In the above-explained circuits, the AND gates 29, 45 respectively have an inverted input.

In the above-explained structure shown in FIG. 3(A) or 3(B), the output signals of the CCD sensor 1 obtained by scanning the reference member 88 shown in FIG. 2 are amplified by the amplifier 3 of which amplification factor is variable by the up-down counter 27. The amplification factor of the amplifier 3 is determined in such a manner the thus amplified output becomes equal to the peak value of a peak retention circuit composed of a diode 39, a capacitor 41 and a resistor 3 (FIG. 3A), or that it becomes equal to the voltage of the constant-voltage power source 7 (FIG. 3B), and thus determined control condition is preserved in the RAM 35 and is reproduced in the image reading operation.

The above-explained structures allow correction of the shading distortion and to effect gain control for compensating time-dependent change etc., thereby enabling to dispense with expensive A/D converter and to reduce the capacity of the RAM.

Figure 4:
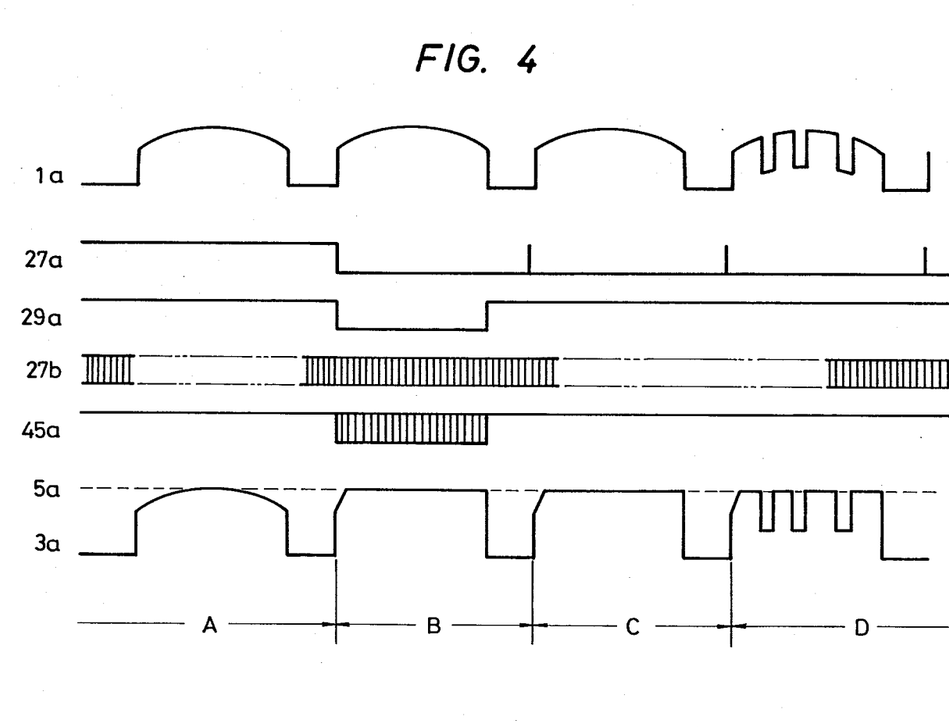
FIG. 4 is a wave form chart showing the function of the circuits shown in FIG. 3.
Figure 5:
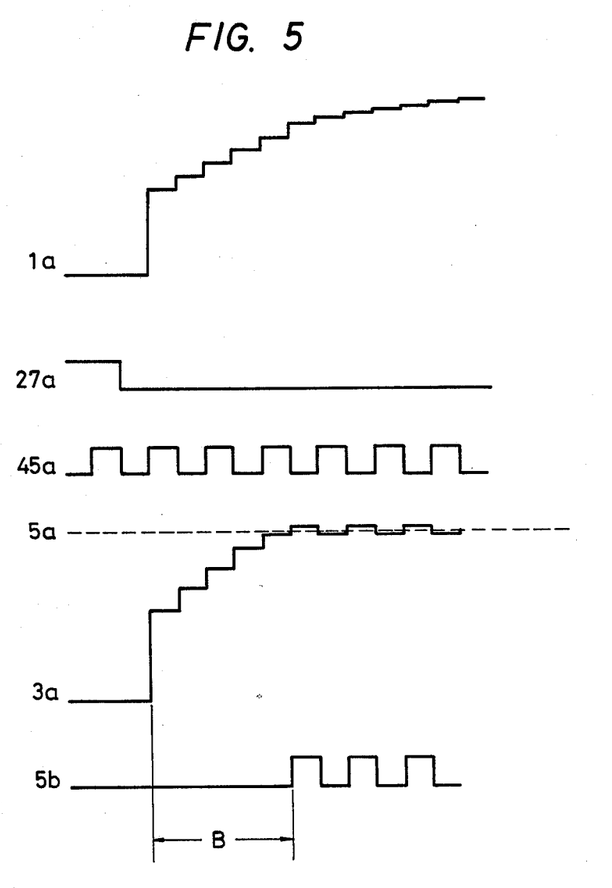
FIG. 5 is an enlarged wave form chart of a section B shown in FIG. 4.

Now reference is made to FIGS. 4 and 5 for explaining the detailed function of the above-explained circuits. Since the circuits shown in FIGS. 3A and 3(B) function in a similar manner, the following explanation will be concentrated to the circuit shown in FIG. 3(A).

In reading the reference member 88, prior to the reading of the original image, there is obtained, on the output signal line 1a of the CCD sensor 1, an output wave form lower in the end portions, i.e., including shading distortions, as shown in the sections A–C in FIG. 4.

In the section A, the signal line 27 is shifted to a high level to preset the up-down counter 27, whereby the switches 19, 21, 23, 25 are all closed to shortcircuit all the feedback resistors, so that the gain of the operational amplifier 3 is maintained at a minimum value. Consequently the output of the amplifier 3 the same as the input signal, as represented by 3a in FIG. 4. In this state the signal line 29a is at a high level state to close the switch 37, whereby the peak of the signal on the signal line 3a is retained in the peak hold circuit composed of the diode 39, capacitor 41 and resistor 43.

In the succeeding section B the signal lines 27a and 29a are both shifted to the low level state to cancel the preset state, whereby the up-down counter 27 initiates an up- or down-count operation in synchronization with the clock signals CLK on the signal line 27b. An instruction for an up- or down-count operation is entered through the OR gate 31.

The switch 37 is opened by the low level state of the signal line 29a, whereby the comparator 5 compares the above-mentioned peak value at the inverted input terminal with the signal on the signal line 3a supplied to the non-inverted input terminal. In this manner the comparator 5 compares the signal on the signal line 3a with the peak value obtained by scanning the reference member and retained in the section A, and releases a low-level signal if the former is smaller. In this case the AND gate 29 and the OR gate both release low-level output signals, whereby the counter 27 is switched to a down-count mode.

The 4-bit output of the up-down counter 27 controls the gain of the amplifier 3 over $2^4$ levels. The gain of the amplifier 3 increases as the count decreases, so that the output signal on the signal line 3a approaches the retained peak value as the output of the coutner decreases. On the other hand, in a case where the signal on the signal line 3a is higher than the peak value, the comparator 5 releases a high-level output signal, whereby the OR gate 31 releases a high-level output signal to shift the up-down counter 27 to an up-count mode. Consequently the gain of the amplifier 3 is reduced in an inverse function. In this manner the output on the signal line 3a is so controlled as to approach a constant value in the section B.

In the section B, the output signals of the comparator 5 are stored in the RAM 35 in succession, in synchronization with the clock signals CLK. Since the read/write control is achieved by the output signal of the AND gate 45, the writing operation is enabled only when the signal on the signal line 29a is at the low level, as indicated by the section B in FIG. 4. Thus the information on the up/down-count operation of the counter 27 is stored in the RAM 35 for a scanning operation of the CCD sensor 1.

FIG. 5 is an enlarged view of a leading portion of the section B in FIG. 4. In the illustrated case the signal on the signal line 3a is lower than the peak value defined in the section A, so that the up-down counter 27 is shifted to the up-count mode as explained before and the output signal of the signal line 3a gradually approaches the peak value on the signal line 5a. When said peak value is reached, the output of the comparator 5 repeats inversion to maintain the output of the up-down counter almost constant. A constant output can be obtained in this manner.

However, in the initial period of the scanning in each section, the correcting output signal is not stable but increases as shown in FIG. 5. For this reason, the length of the CCD sensor 1 and of the reference number is selected to be longer than the actual image scanning range of the maximum readable width of an original, corresponding to said increasing period.

In succeeding sections C, D there are respectively conducted scanning of the reference member and the original. In this state the signal line 29a is maintained at the high-level state, and a preset signal PRES on the signal line 27a presets the counter 27 to a predetermined value in synchronization with the start of scanning operation. Due to the high level state of the signal line 29a, clock signals are supplied to the RAM 35 from the AND gate 46, whereby the data already stored in the RAM 35 are released in synchronization with said clock signals and supplied to the up-down counter 27 through the AND gate 33 and OR gate 31. Consequently the switches 19, 21, 23, 25 are controlled, during the reading operation, in the same manner as in the scanning of the reference member, so that the gain of the amplifier 3 is controlled in the same manner as in the section B. In this manner the output signals of the signal line 3a during the reading of the reference member in the section C are controlled to a constant level as in the section B, and, in the section D, there are obtained uniform image signals with satisfactory correction of shading distortion over the entire range of the original image, under similar gain control. Particularly, in the present embodiment there is realized secure correction of shading distortion in the actual scanning range, since a dummy scanning is conducted with an extended CCD sensor 1 corresponding to a range where the control of the up-down counter is unstable.

In the circuit shown in FIG. 3B, the peak value detection in the section A can be dispensed with since the output of the amplifier 3 is compared with the voltage V1 of the constant-voltage power source 7. Consequently, in the section B and following sections there is conducted an AGC control in which the output is controlled constant in a similar operation, with reference to a predetermined voltage V1. In this manner it is rendered possible to compensate for the fluctuation, deterioration, etc., of the light source and image reading element.

As explained in the foregoing, the present embodiment requires the storage of one bit of correction data for shading or output, for one bit of image signals, and allows to significantly reduce the capacity of the RAM 35, in comparison with the conventional structure employing an A/D converter. In such conventional structure, the amount of correction data to be stored increases with the accuracy of the A/D converter to be employed. For example an 8-bit A/D converter requires the storage of information of 8 bits for each bit of image signal. In this manner the present embodiment enables to correct the shading distortion or of the output by a simple and inexpensive structure employing a small RAM and not requiring an expensive high-speed A/D converter.

Though the present invention has been explained by a preferred embodiment thereof, the present invention is not limited to such embodiment but is subject to various modification and variations within the scope and spirit of the appended claims.

What is claimed is:

1. An image reading apparatus comprising:
   means for photoelectrically reading an image line by line;
   means for amplifying output signals of said reading means;
   means for determining a control condition of said amplifying means in such a manner that each level of output signals representing a line of image of said amplifying means is substantially constant when a reference member is read by said reading means;
   means for storing control data indicating the control condition determined by said determining means; and
   control means for controlling said amplifying means, while an original image is read by said reading means, based on the control data read out from said storing means so as to remove shading distortion contained in output signals of said reading means.

2. An image reading apparatus according to claim 1, wherein said determining means is operable to detect a peak level of the output signals of said amplifying means during the reading of the reference member by said reading means, and to determine the control conditions of said amplifying means in such a manner that each level of output signals become substantially equal to said peak level.

3. An image reading apparatus according to claim 1, wherein said determining means is operable to determine the control condition of said amplifying means in such a manner that each level of output signals of said amplifying means, when the reference member is read by said reading means, becomes substantially equal to a predetermined value.

4. An image reading apparatus according to claim 1, wherein said determining means is operable to determine a gain of said amplifying means.

5. An image reading apparatus according to claim 1, wherein said storing means stores data indicative of increase-decrease status of a gain of said amplifying means.

6. An image reading apparatus according to claim 1, wherein said storing means reads out data in synchronization with original reading operation of said reading means.

7. An image reading apparatus according to claim 1, wherein said reading means reads the reference member prior to reading of the original image.

8. An image reading apparatus according to claim 1, wherein said apparatus comprises the reference member, and said reference member is a white member.

9. An image reading apparatus comprising:
means for photoelectrically reading an image line by line;
means for amplifying output signals of said reading means;
means for detecting a peak level of output signals of said amplifying means when a reference member is read by said reading means;
means for determining the control condition of said amplifying means in such a manner that each level of output signals representing a line of image of said amplifying means, when the reference member is read by said reading means, becomes substantially equal to the peak level detected by said detecting means; and
means for controlling said amplifying means, while an original image is read by said reading means, based on the control condition determined by said determining means, so as to remove shading distortion contained in output signals of said reading means.

10. An image reading apparatus according to claim 9, wherein said control means is operable to control a gain of said amplifying means.

11. An image reading apparatus according to claim 9, wherein said determining means has means for storing control data indicative of the determined control condition.

12. An image reading apparatus according to claim 9, wherein said reading means reads the reference member a plurality of times, and wherein, at the first time of reading, the peak level is detected by said detecting means, and at the second time of reading, the control condition is determined by said determining means.

13. An image reading apparatus according to claim 9, wherein said detecting means holds the detected peak level and said determining means determines the control condition by comparing the held peak level with each level of output signals of said amplifying means.

14. An image reading apparatus according to claim 11, wherein said storing means out the control data in synchronization with original image reading of said reading means.

15. An image reading apparatus according to claim 9, wherein said apparatus comprises the reference member, and said reference member is a white member.

16. An image reading apparatus comprising:
means for photoelectrically reading an image line by line;
means for amplifying output signals of said reading means;
means for detecting status of change of output signals representing a line of image of said reading means, when a reference member is read by said reading means;
means for storing data indicating the status of change of output signals detected by said detecting means; and
means for controlling said amplifying means, while an original image is read by said reading means based on the data read out from said storing means, so as to remove shading distortion contained in output signals of said reading means.

17. An image reading apparatus according to claim 16, wherein said control means is operable to control a gain of said amplifying means.

18. An image reading apparatus according to claim 16, wherein said detecting means is operable to detect the status of change based on output signals of said amplifying means obtained when the reference member is read by said reading means.

19. An image reading apparatus according to claim 16, wherein said detecting means detects the status of change by comparing the reference level with each level of the output signals of said reading means upon reading of the reference member.

20. An image reading apparatus according to claim 16, wherein said storing means stores data indicative of increase-decrease status of a gain of said amplifying means.

21. An image reading apparatus according to claim 16, wherein said storing means reads out data in synchronization with original reading operation of said reading means.

22. An image reading apparatus according to claim 16, wherein said control means has count means for conducting a count operation in accordance with the data read out from said storing means, and controls said amplifying means in response to the count value in said count means.

23. An image reading apparatus according to claim 16, wherein said reading means reads the reference member prior to the original image reading.

24. An image reading apparatus according to claim 16, wherein said apparatus comprises the reference member and said reference member is a white member.

25. An image reading apparatus according to claim 16, wherein a reading range of said reading means is selected to be larger than an effective range of the original image.

* * * * *

UNITED STATES PATENT AND TRADEMARK OFFICE
CERTIFICATE OF CORRECTION

PATENT NO. : 4,821,099
DATED : April 11, 1989
INVENTOR(S) : MASAHIRO SAKAMOTO

It is certified that error appears in the above-identified patent and that said Letters Patent is hereby corrected as shown below:

COLUMN 1

Line 21, "flourescent lamp" should read --fluorescent lamps,--.

COLUMN 2

Line 21, "on" should read --one--.

COLUMN 3

Line 53, "Also" should read --Also,--.
Line 60, "output terminal O" should read --output terminal $\overline{O}$--.

COLUMN 4

Line 21, "manner the" should read --manner that the--.
Line 23, "resistor 3" should read --resistor 43--.
Line 35, "FIGS. 3A and 3(B)" should read --FIGS. 3A and 3B--.
Line 37, "FIG. 3(A)." should read --FIG. 3A.--.
Line 49, "amplifier 3 the" should read --amplifier 3 is the--.

UNITED STATES PATENT AND TRADEMARK OFFICE
CERTIFICATE OF CORRECTION

PATENT NO. : 4,821,099
DATED : April 11, 1989
INVENTOR(S) : MASAHIRO SAKAMOTO

Page 2 of 2

It is certified that error appears in the above-identified patent and that said Letters Patent is hereby corrected as shown below:

COLUMN 5

Line 10, "coutner" should read --counter--.
    Line 30, "leading portion" should read --reading portion--.
    Line 44, "reference number" should read --reference member--.
    Line 46, "of" (first occurrence) should read --or--.

COLUMN 6

Line 30, "or" should be deleted.
    Line 65, "become" should read --becomes--.

COLUMN 8

Line 2, "means out" should read --means reads out--.

Signed and Sealed this

Twelfth Day of December, 1989

*Attest:*

JEFFREY M. SAMUELS

*Attesting Officer*      *Acting Commissioner of Patents and Trademarks*